(12) United States Patent
Uenoyama et al.

(10) Patent No.: US 11,694,551 B2
(45) Date of Patent: Jul. 4, 2023

(54) INFORMATION PROCESSING DEVICE, PROGRAM, AND INFORMATION PROCESSING METHOD

(71) Applicant: TOYOTA JIDOSHA KABUSHIKI KAISHA, Toyota (JP)

(72) Inventors: Naoki Uenoyama, Nagoya (JP); Koichi Suzuki, Nagoya (JP); Ryo Kamimura, Shizuoaka-ken (JP); Daisuke Nakata, Seto (JP); Yuki Tatsumoto, Nagoya (JP); Yusuke Futakuchi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 17/221,984

(22) Filed: Apr. 5, 2021

(65) Prior Publication Data
US 2021/0390857 A1 Dec. 16, 2021

(30) Foreign Application Priority Data
Jun. 16, 2020 (JP) ................ 2020-104111

(51) Int. Cl.
| | |
|---|---|
| G08G 1/16 | (2006.01) |
| G08G 1/052 | (2006.01) |
| G08G 1/056 | (2006.01) |
| G06V 20/58 | (2022.01) |
| G01C 21/34 | (2006.01) |
| G01C 21/00 | (2006.01) |
| G08G 1/0967 | (2006.01) |

(52) U.S. Cl.
CPC ......... *G08G 1/162* (2013.01); *G01C 21/3461* (2013.01); *G01C 21/3811* (2020.08); *G06V 20/58* (2022.01); *G08G 1/052* (2013.01); *G08G 1/056* (2013.01); *G08G 1/096716* (2013.01); *G06V 2201/08* (2022.01)

(58) Field of Classification Search
CPC ........ G08G 1/162; G08G 1/052; G08G 1/056; G08G 1/096716; G01C 21/3461; G01C 21/3811; G06V 20/58; G06V 2201/08
See application file for complete search history.

(56) References Cited

U.S. PATENT DOCUMENTS

| | | | |
|---|---|---|---|
| 9,656,606 B1 * | 5/2017 | Vose | G05D 1/0278 |
| 10,490,078 B1 * | 11/2019 | Fields | G08G 1/096838 |
| 10,974,725 B2 * | 4/2021 | Tsuchiya | B60W 10/04 |
| 11,186,297 B2 * | 11/2021 | Mimura | B60W 50/14 |
| 2010/0250045 A1 * | 9/2010 | Miura | G08G 1/16 701/31.4 |

(Continued)

FOREIGN PATENT DOCUMENTS

| | | | | |
|---|---|---|---|---|
| CN | 110807565 A | * | 2/2020 | ......... G06Q 10/0635 |
| ES | 2327022 A1 | * | 10/2009 | ........... G08G 1/0962 |

(Continued)

OTHER PUBLICATIONS

U.S. Appl. No. 17/225,714, filed Apr. 8, 2021.

*Primary Examiner* — Dale W Hilgendorf
(74) *Attorney, Agent, or Firm* — Sughrue Mion, PLLC

(57) ABSTRACT

An information processing device includes a communication unit and a control unit. The control unit determines a degree of danger of an area based on information on at least one vehicle traveling in the area which is received by the communication unit.

19 Claims, 3 Drawing Sheets

(56) References Cited

U.S. PATENT DOCUMENTS

| | | | | |
|---|---|---|---|---|
| 2013/0010112 | A1* | 1/2013 | Goto | H04N 7/18 |
| | | | | 348/148 |
| 2016/0027281 | A1* | 1/2016 | Hamano | G08G 1/096716 |
| | | | | 701/515 |
| 2017/0292848 | A1* | 10/2017 | Nepomuceno | G01C 21/3492 |
| 2018/0367958 | A1* | 12/2018 | Dizdarevic | G08G 1/096716 |
| 2019/0096260 | A1* | 3/2019 | Ahn | G08G 1/096725 |
| 2019/0120641 | A1* | 4/2019 | Dong | G01C 21/3697 |
| 2019/0156671 | A1* | 5/2019 | Oe | G08G 1/096791 |
| 2019/0300017 | A1* | 10/2019 | Glaser | G08G 1/0133 |
| 2019/0361436 | A1* | 11/2019 | Ueda | G08G 1/09 |
| 2020/0118360 | A1* | 4/2020 | Kawakatsu | G06V 20/597 |
| 2020/0242927 | A1* | 7/2020 | Sekiguchi | G08G 1/096775 |
| 2020/0247404 | A1* | 8/2020 | Ohe | G08G 1/0175 |
| 2021/0270620 | A1* | 9/2021 | Nepomuceno | G01C 21/3626 |
| 2021/0316721 | A1* | 10/2021 | Lim | B60W 30/09 |
| 2022/0180738 | A1* | 6/2022 | Dubner | G08G 1/0141 |

FOREIGN PATENT DOCUMENTS

| | | | | |
|---|---|---|---|---|
| JP | H05203739 A | * | 8/1993 | G01S 13/93 |
| JP | 2000090243 A | * | 3/2000 | G06K 9/00798 |
| JP | 2010-237829 A | | 10/2010 | |
| JP | 2011014097 A | * | 1/2011 | G08G 1/16 |
| KR | 20170011328 A | * | 2/2017 | G08G 1/0962 |

* cited by examiner

INFORMATION PROCESSING DEVICE, PROGRAM, AND INFORMATION PROCESSING METHOD

INCORPORATION BY REFERENCE

The disclosure of Japanese Patent Application No. 2020-104111 filed on Jun. 16, 2020 including the specification, drawings and abstract is incorporated herein by reference in its entirety.

BACKGROUND

1. Technical Field

The present disclosure relates to information processing devices, programs, and information processing methods.

2. Description of Related Art

There is a known device for diagnosing a driver's vehicle operation based on a vehicle parameter and driving diagnosis determination criteria set for each diagnostic item (for example, Japanese Unexamined Patent Application Publication No. 2010-237829 (JP 2010-237829 A)). The device described in JP 2010-237829 A acquires information on accident factors at accident-prone points around the vehicle, at which vehicle accidents occurred more than a predetermined number of times in the past, and when the vehicle travels through the accident-prone points, the device changes the driving diagnosis determination criteria based on the accident factors at the accident-prone points.

SUMMARY

There is room for improvement in the technique of the related art. For example, in the technique of the related art, an area that does not include accident-prone points is not regarded as a dangerous area.

An object of the present disclosure is to improve the technique for determining a risk level of the area.

An information processing device according to the present disclosure includes: a communication unit; and a control unit that determines a degree of danger of an area based on information on at least one vehicle traveling in the area which is received by the communication unit.

A program according to the present disclosure causes a computer to perform operations including: receiving information on at least one vehicle traveling in an area; and determining a degree of danger of the area based on the information on the vehicle.

An information processing method according to the present disclosure includes: receiving, with an information processing device, information on at least one vehicle traveling in an area; and determining, with the information processing device, a degree of danger of the area based on the information on the vehicle.

According to the present disclosure, it is possible to improve a technique for determining a risk level of an area.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
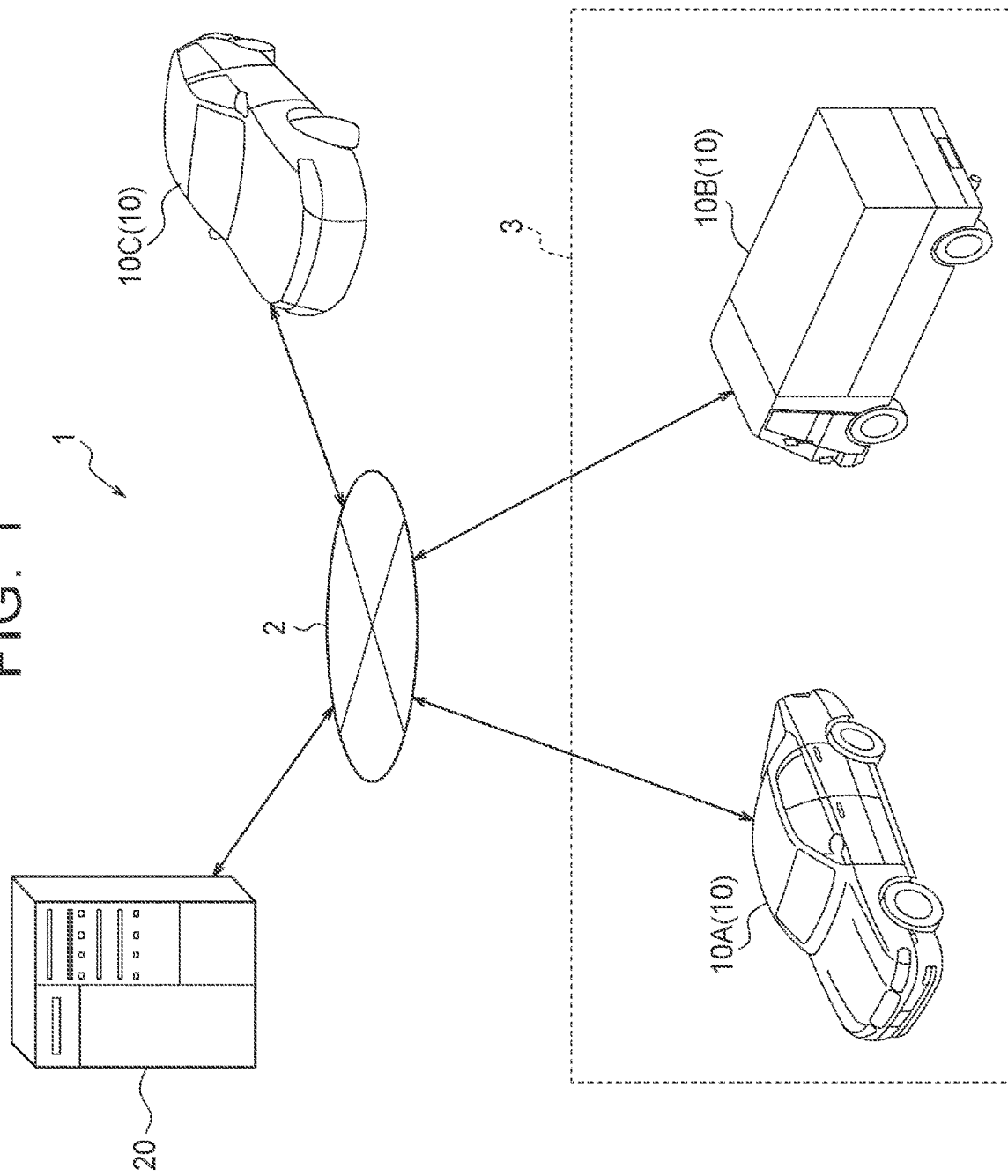
FIG. 1 is a diagram showing a configuration of an information processing system according to an embodiment of the present disclosure.

Hereinafter, embodiments of the present disclosure will be described below with reference to the drawings. In the components shown in the drawings, the same components are designated by the same reference numerals.

Configuration of Information Processing System

As shown in FIG. 1, an information processing system 1 according to an embodiment of the present disclosure includes vehicles 10A, 10B, 10C and an information processing device 20.

Hereinafter, when the vehicle 10A, the vehicle 10B, and the vehicle 10C are not particularly distinguished, these are collectively referred to as "vehicles 10". FIG. 1 shows the information processing system 1 including the three vehicles 10. However, the information processing system 1 may include at least one vehicle 10.

The vehicle 10 and the information processing device 20 can communicate with each other via the network 2. The network 2 may be any network including a mobile communication network, the Internet, and the like. As illustrated by the two-headed arrows in FIG. 1, two-way communication is provided for transmitting information between the information processing device 20 and the plurality of vehicles 10A 10B 10C via the network 2.

The vehicle 10 may be any type of automobile. The vehicle 10 is, for example, a gasoline vehicle, a diesel vehicle, a hybrid vehicle (HV), a plug-in hybrid vehicle (PHV), an electric vehicle (EV), a fuel cell vehicle (FCV), or the like. The driving of the vehicle 10 may be automated at any level. The level of automation is, for example, one of level 1 to level 5 classified by the Society of Automotive Engineers (SAE).

The classification of the vehicles 10 may be any classification. The classification of the vehicles 10 is, for example, a passenger car, a truck, a bus, or the like. The vehicle 10 may be a vehicle dedicated to "Mobility-as-a-Service (MaaS)". The classification of the vehicles 10A and 10C is, for example, a passenger car. The classification of the vehicle 10B is, for example, a truck.

The vehicles 10 may be used as private vehicles or may be operated as commercial vehicles. The vehicles 10A, 10C are used as private vehicles. The vehicle 10B is operated as a commercial vehicle. The vehicle 10A and the vehicle 10B are traveling in an area 3. The vehicle 10C is traveling outside the area 3.

The information processing device 20 determines a degree of danger of the area 3 based on information on at least one vehicle 10 traveling in the area 3. The information of the vehicle 10 traveling in the area 3 is, for example, information on the vehicle 10A and information on the vehicle 10B. Details of this process will be described later. The area 3 may be set as appropriate. The area 3 may be any range. The area 3 is a range of cities, wards, towns and villages, a range further subdivided than the range of cities, wards, towns and villages, and a range wider than the range of cities, wards, towns and villages, for example.

The information processing device 20 may be a dedicated computer configured to function as a server, a general-purpose personal computer, a cloud computing system, or the like.

Figure 2:
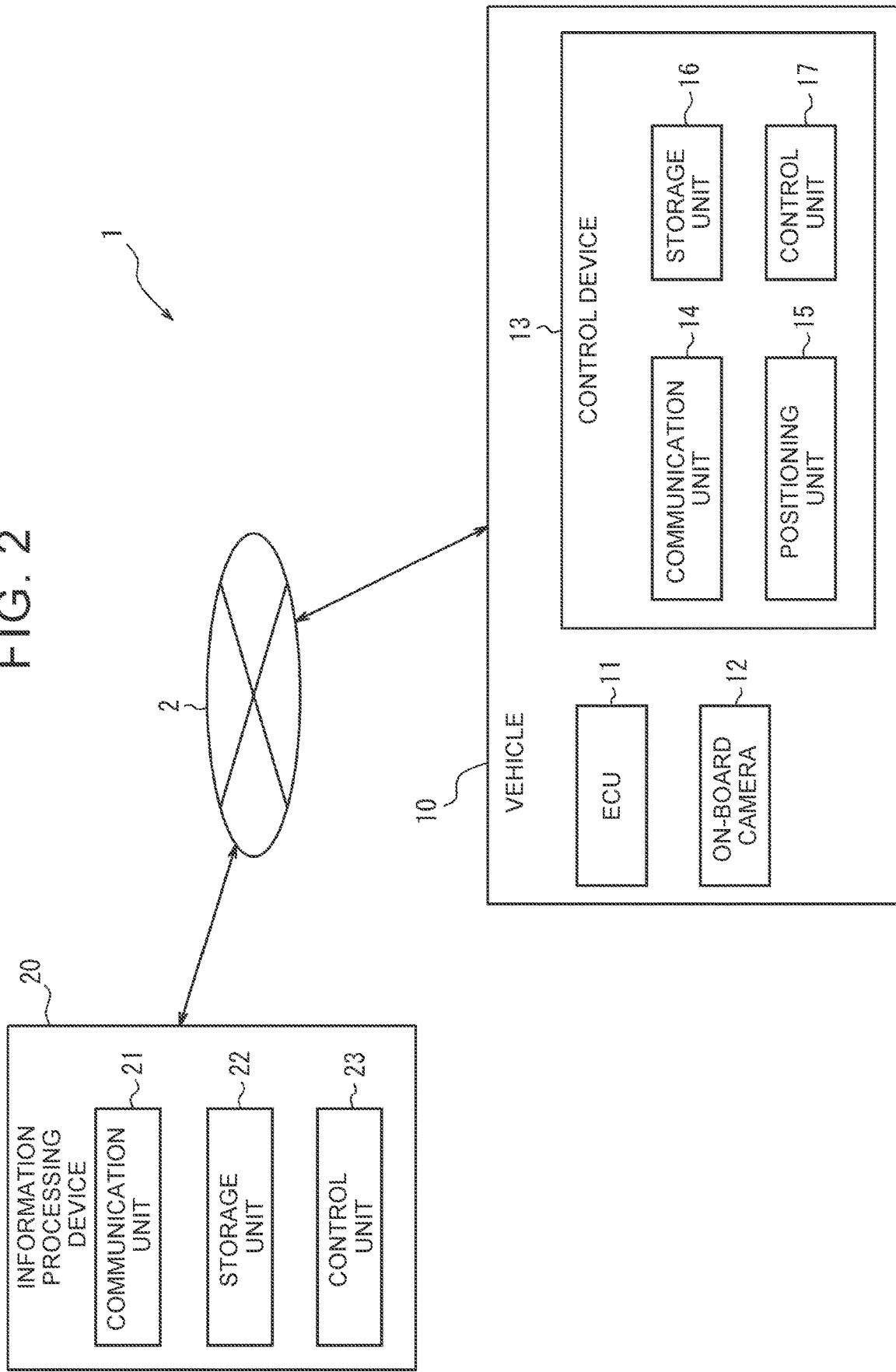
FIG. 2 is a block diagram showing a detailed configuration of the information processing system shown in FIG. 1.

As shown in FIG. 2, the vehicle 10 includes an electronic control unit (ECU) 11 and a control device 13. The vehicle 10 may further include an on-board camera 12. The ECU 11, the on-board camera 12, and the control device 13 are connected to each other via a vehicle-mounted network such as controller area network (CAN) or a dedicated line so as to be able to communicate with each other.

The ECU 11 is a control unit that controls various devices mounted on the vehicle 10. The ECU 11 outputs traveling information of the vehicle 10 and information on the devices of the vehicle 10 to the control device 13 based on the control of the control device 13. The traveling information of the vehicle 10 is, for example, information on a speed of the vehicle 10, information on a deceleration of the vehicle 10, information on an acceleration of the vehicle 10, and the like. The deceleration of the vehicle 10 is, for example, a rate at which the speed of the vehicle 10 decreases per unit time. The acceleration of the vehicle 10 is, for example, a rate at which the speed of the vehicle 10 increases per unit time. The information on the devices of the vehicle 10 is, for example, information on the number of times the horn of the vehicle 10 is honked, information on the steering angle of the wheels of the vehicle 10, information on the blinking of a turn signal of the vehicle 10, and the like.

The on-board camera 12 can include an imaging optical system and an imaging element. The on-board camera 12 can be mounted on the vehicle 10 so as to be able to image a subject in front of the vehicle 10. The subject in front of the vehicle 10 includes, for example, a road, a traffic signal, and the like in front of the vehicle 10. The on-board camera 12 captures an image of the subject in front of the vehicle 10 to generate the captured image based on the control of the control device 13. The on-board camera 12 outputs the generated captured image data to the control device 13 based on the control of the control device 13. The on-board camera 12 may continuously generate captured images at any frame rate based on the control of the control device 13. The on-board camera 12 may output the continuously generated captured image data to the control device 13 based on the control of the control device 13.

The control device 13 may be a part of the ECU 11. The control device 13 includes a communication unit 14, a positioning unit 15, a storage unit 16, and a control unit 17.

The communication unit 14 can include at least one communication module that can be connected to the network 2. The communication module is, for example, a communication module conforming to mobile communication standards such as the long term evolution (LTE), fourth generation (4G), or fifth generation (5G).

The positioning unit 15 acquires position information of the vehicle 10 based on the control of the control unit 17. The positioning unit 15 outputs the acquired position information of the vehicle 10 to the control unit 17 based on the control of the control unit 17. The positioning unit 15 can include a global positioning system (GPS) receiving module.

The storage unit 16 can include at least one semiconductor memory, at least one magnetic memory, at least one optical memory, or a combination of at least two of them. The semiconductor memory is, for example, a random access memory (RAM) or a read-only memory (ROM). The RAM is, for example, a static random access memory (SRAM) or a dynamic random access memory (DRAM). The ROM is, for example, an electrically erasable programmable read only memory (EEPROM). The storage unit 16 may function as a main storage device, an auxiliary storage device, or a cache memory. The storage unit 16 stores data used for the operations of the control device 13 and data obtained through the operation of the control device 13.

For example, the storage unit 16 stores information on the size of the vehicle 10 and information on the classification of the vehicle 10. The size of the vehicle 10 includes, for example, at least one of the length of the vehicle 10, the width of the vehicle 10, and the height of the vehicle 10. For example, when the vehicle 10 is a gasoline vehicle, a diesel vehicle, or the like, the storage unit 16 stores information on the displacement of the engine of the vehicle 10.

The control unit 17 can include at least one processor, at least one dedicated circuit, or a combination thereof. The processor is a general-purpose processor such as a central processing unit (CPU) or a graphics processing unit (GPU), or a dedicated processor specialized for a specific process. The dedicated circuit is, for example, a field-programmable gate array (FPGA) or an application-specific integrated circuit (ASIC). The control unit 17 can perform processes related to the operations of the control device 13 while controlling each unit of the control device 13. The control unit 17 may have a timekeeping function for acquiring the current time.

The function of the control device 13 can be realized by executing the control program according to the present embodiment with the processor corresponding to the control unit 17. That is, the function of the control device 13 can be realized by software. The control program can cause the computer to perform the operations of the control device 13 so that the computer functions as the control device 13. That is, the computer can function as the control device 13 by performing the operations of the control device 13 according to the control program.

In the present disclosure, the "program" can be recorded on a computer-readable non-transitory recording medium. The computer-readable non-transitory recording medium is, for example, a magnetic recording device, an optical disc, an opto-magnetic recording medium, or a ROM. The distribution of the program is carried out, for example, by selling, transferring, or renting a portable recording medium such as a digital versatile disc (DVD) or a compact disc read only memory (CD-ROM) on which the program is recorded. The program may be stored in the storage of the server. The program stored in the storage of the server may be distributed by being transferred to another computer. The program may be provided as a program product.

In the present disclosure, for example, the "computer" can temporarily store a program recorded on a portable recording medium or a program transferred from the server in a main storage device. In addition, the computer can cause the processor to read the program stored in the main storage device and cause the processor to perform processes according to the read program. The computer may read the program directly from the portable recording medium and perform processes according to the program. The computer may perform the processes according to the received program each time the program is transferred from the server to the computer. The computer may execute the processes with a so-called application service provider (ASP) type service that realizes the function only by the execution command and the result acquisition without transferring the program from the server to the computer. The program can include information that is used for processing by electronic computers and equivalent to a program. For example, data that is not a direct command to a computer but has the property of defining the processing of the computer corresponds to the "data equivalent to a program".

A part or all of the functions of the control device 13 may be realized by a dedicated circuit corresponding to the control unit 17. That is, a part or all of the functions of the control device 13 may be realized by hardware.

The control unit 17 can acquire the information on the vehicle 10. The control unit 17 can transmit through the communication unit 14 the acquired information on the vehicle 10 to the information processing device 20 via the network 2. The information on the vehicle 10 may include any information that can be a material for determining the degree of danger of the area 3. The information on the vehicle 10 may include any of the traveling information of the vehicle 10, the information on the devices of the vehicle 10, the information on the size of the vehicle 10, the information on the engine displacement of the vehicle 10, the classification information of the vehicle 10, the position information of the vehicle 10, and the captured image data generated by the on-board camera 12. The control unit 17 can acquire the traveling information of the vehicle 10 and the information on the devices of the vehicle 10 from the ECU 11. The control unit 17 can acquire the information on the size of the vehicle 10, the information on the engine displacement of the vehicle 10, and the classification information of the vehicle 10 from the storage unit 16. The control unit 17 can acquire the position information of the vehicle 10 from the positioning unit 15. The control unit 17 can acquire the data of the captured image generated by the on-board camera 12 from the on-board camera 12. Here, the control unit 17 may acquire the time when the information on the vehicle 10 is acquired, with the timekeeping function. The control unit 17 may transmit to the information processing device 20 information in which the acquired time is associated with the information on the vehicle 10. Hereinafter, the time when the control unit 17 acquires the position information of the vehicle 10 from the positioning unit 15 is also referred to as "acquisition time". Further, the time when the control unit 17 acquires the data of the captured image from the on-board camera 12 is also referred to as "imaging time". The imaging time can be regarded as the time when the on-board camera 12 generates the data of the captured image through imaging.

The control unit 17 may transmit the information on the vehicle 10 to the information processing device 20 at a time interval set in advance. The time interval may be appropriately set based on the average speed of the vehicle 10, the size of the area 3, and the like. The time interval is shorter than, for example, a time period from a time when the vehicle 10 enters the area 3 to a time when the vehicle 10 leaves the area 3. With such a configuration, the information on the vehicle 10 can be transmitted from the vehicle 10 to the information processing device 20 at least once from the time when the vehicle 10 enters the area 3 to the time when the vehicle 10 leaves the area 3.

As shown in FIG. 2, the information processing device 20 includes a communication unit 21, a storage unit 22, and a control unit 23.

The communication unit 21 can include at least one communication module that can be connected to the network 2. The communication module is, for example, a communication module corresponding to a standard such as a wired local area network (LAN) or a wireless LAN. The communication unit 21 may be connected to the network 2 with the communication module via a wired LAN or a wireless LAN.

The storage unit 22 can include at least one semiconductor memory, at least one magnetic memory, at least one optical memory, or a combination of at least two of them, similarly to the configuration of the storage unit 16. The storage unit 22 may function as a main storage device, an auxiliary storage device, or a cache memory. The storage unit 22 stores data used for the operations of the information processing device 20 and data obtained through the operations of the information processing device 20.

For example, map information of the area 3 is stored in the storage unit 22. The map information of the area 3 may be road map information for vehicles. The map information of the area 3 can include position information of intersections, position information of traffic signals, position information of stop signs, position formation of parking-prohibited places, and the like. The positions of the stop signs and the positions of the parking-prohibited places may be set in advance according to the traffic rules such as the Road Traffic Act which is applied to the area 3. In the map information of the area 3, the roads may be associated with information on a reference speed described later. The storage unit 22 may store the information on the reference speed, which will be described later, associated with the width of the road.

For example, information on the control timing of traffic signal is stored in the storage unit 22. The information on the control timing of the traffic signal includes, for example, information on the timing when the signal of the traffic signal becomes a stop instruction signal, information on the timing when the signal of the traffic signal becomes an advancement permission signal, and the like.

The information stored in the storage unit 22 may be acquired from an external server via the network 2 through the control unit 23 and the communication unit 21, for example. The information stored in the storage unit 22 may be updated and communicated via the network 2 as appropriate.

The control unit 23 can include at least one processor, at least one dedicated circuit, or a combination thereof, similarly to the configuration of the control unit 17. The control unit 23 can perform processes related to the operations of the information processing device 20 while controlling various units of the information processing device 20.

The function of the information processing device 20 can be realized by executing the information processing program according to the present embodiment with the processor corresponding to the control unit 23. That is, the function of the information processing device 20 can be realized by software. The information processing program can cause the computer to function as the information processing device 20 by causing the computer to perform the operations of the information processing device 20. That is, the computer can function as the information processing device 20 by performing the operations of the information processing device 20 according to the information processing program.

A part or all of the functions of the information processing device 20 may be realized by a dedicated circuit corresponding to the control unit 23. That is, a part or all of the functions of the information processing device 20 may be realized by hardware.

The control unit 23 can transmit and receive the information on at least one vehicle 10 traveling in the area 3 through the communication unit 21 via the network 2. When the control unit 23 detects that there is the vehicle 10 in the area 3 based on the received information on the vehicle 10, the information on the vehicle 10 may be regarded as the information on the vehicle 10 traveling in the area 3.

As an example, when the information on the vehicle 10 includes the position information of the vehicle 10, the control unit 23 may detect that there is the vehicle 10 in the area 3 based on the position information of the vehicle 10 and the map information of the area 3 stored in the storage unit 22. Specifically, the control unit 23 may detect that there is the vehicle 10 in the area 3 when the position of the vehicle 10 is included in the area 3.

As another example, when the information on the vehicle 10 includes the data of the captured image of the on-board camera 12, the control unit 23 may detect that there is the vehicle 10 in the area 3 by analyzing the data of the captured image. Specifically, the control unit 23 may detect that there is the vehicle 10 in the area 3, when the control unit 23 analyzes the data of the captured image to detect a signboard such as a guide sign located in the area 3 from the captured image. In the present embodiment, the process of analyzing the data of the captured image with the control unit 23 may include an object detection process and an object recognition process.

The control unit 23 determines the degree of danger of the area 3 based on the information of at least one vehicle 10 traveling in the area 3. The degree of danger may be an index indicating the degree of danger due to road traffic. The higher the degree of danger, the greater the degree of danger due to road traffic in the area 3. The degree of danger may be given as a numerical value. In such a case, the higher the degree of danger, the larger the numerical value may be. The degree of danger may be given as any level. The degree of danger is given, for example, as three levels "low", "medium", and "high". An example of the process for determining the degree of danger will be described below. In the following process example, it is assumed that the information on the vehicle 10 is the information on the vehicle 10 traveling in the area 3.

Example 1

When the information on the vehicle 10 includes the information on the speed of the vehicle 10, the control unit 23 may determine the degree of danger by analyzing the information on the speed of the vehicle 10. Here, the higher the speed of the vehicle 10, the higher the possibility that the vehicle 10 will cause an accident. Further, the higher the speed of the vehicle 10, the greater the damage caused by the accident when the vehicle 10 causes an accident. That is, the speed of the vehicle 10 traveling in the area 3 can be related to the risk level of the area 3. Thus, the degree of danger of the area 3 can be determined by analyzing the information on the speed of the vehicle 10.

When the speed of the vehicle 10 is higher than a reference speed set in advance, the control unit 23 may determine a higher degree of danger as the degree of danger of the area 3 compared with the case where the speed of the vehicle 10 is equal to or lower than the reference speed. The control unit 23 may use the maximum speed of the vehicle 10 detected while the vehicle is traveling in the area 3 as the speed of the vehicle 10.

When the maximum speed of the vehicle 10 that is detected while the vehicle is traveling in the area 3 is used as the speed of the vehicle 10, the reference speed may be appropriately set based on the speed limit efor the vehicle 10 defined by the traffic rule such as the Road Traffic Act applied to the area 3. The reference speed may be the same as the speed limit for the vehicle 10 defined by the traffic rule. Alternatively, the reference speed may be appropriately set within the range of the speed limit ±10 km for the vehicle 10 defined by the traffic rule.

The reference speed may be set in advance in accordance with the width of the road. When the vehicle 10 travels on a narrow road at high speed, an accident caused by the vehicle 10 is more likely to occur compared with the case where the vehicle 10 travels on a wide road at high speed. The reference speed may be set lower as the width of the road in the area 3 is narrower. As an example, when the information on the vehicle 10 includes the position information of the vehicle 10, the control unit 23 may specify the road on which the vehicle 10 is positioned based on the position information of the vehicle 10 and the map information of the area 3 stored in the storage unit 22. The control unit 23 may acquire the reference speed associated with the specified road from the map information of the area 3 stored in the storage unit 22. As another example, when the information on the vehicle 10 includes the data of the captured image of the on-board camera 12, the control unit 23 may estimate the width of the road on which the vehicle 10 is positioned by analyzing the data of the captured image. In such a case, the control unit 23 may acquire the reference speed associated with the estimated road width from the storage unit 22.

The control unit 23 may detect the number of vehicles 10 traveling at speeds exceeding the reference speed in a set period set in advance. The set period may be set in advance based on, for example, the number of vehicles 10 traveling in the area 3 in one day. The set period is, for example, several days to several weeks. When the number of detected vehicles 10 exceeds the set number set in advance, the control unit 23 may determine a higher degree of danger as the degree of danger of the area 3 compared with the case where the number of vehicles 10 is equal to or less than the set number. The set number may be set in advance based on the traffic volume and the like in the area 3.

Example 2

When the information on the vehicle 10 includes the information on the number of times the horn of the vehicle 10 is honked, the control unit 23 may determine the degree of danger of the area 3 by analyzing the information on the number of times that the horn of the vehicle 10 is honked. In general, the horn of the vehicle 10 can be operated by the driver, when the driver wants to avoid danger, and the like. Therefore, the degree of danger of the area 3 can be determined by analyzing the information on the number of times the horn is honked.

When the number of times the horn of the vehicle 10 is honked is more than a reference number of times set in advance, the control unit 23 may determine a higher degree of danger as the degree of danger of the area 3 compared with the case where the number of times the horn is honked is equal to or less than the reference number of times. The reference number of times may be set in advance based on the number of times an ordinary driver operates the horn during each driving.

The control unit 23 may detect the number of vehicles 10 for which the detected number of times the horn is honked exceeds the reference number of times during the above-mentioned set period. When the number of detected vehicles 10 exceeds the set number, the control unit 23 may determine a higher degree of danger as the degree of danger of the area 3 compared with the case where the number of vehicles 10 is equal to or less than the set number.

Example 3

When the information on the vehicle 10 includes the information on the deceleration of the vehicle 10, the control unit 23 may determine the degree of danger of the area 3 by analyzing the information on the deceleration of the vehicle 10. Here, if the vehicle 10 suddenly decelerates, the vehicle 10 may be hit by another vehicle or the like behind the vehicle 10. In addition, the driver may suddenly decelerate the vehicle 10 in order to avoid an accident. That is, the deceleration of the vehicle 10 traveling in the area 3 may be related to the risk level of the area 3. Thus, the degree of danger of the area 3 can be determined by analyzing the information on the deceleration of the vehicle 10.

When the deceleration of the vehicle 10 is larger than a reference deceleration set in advance, the control unit 23 may determine a higher degree of danger as the degree of danger of the area 3 compared with the case where the deceleration of the vehicle 10 is equal to or smaller than the reference deceleration. The reference deceleration may be set in advance based on the deceleration of the vehicle 10 when sudden braking is applied.

The control unit 23 may detect the number of vehicles 10 that have traveled at decelerations exceeding the reference deceleration during the above-mentioned set period. When the number of detected vehicles 10 exceeds the set number, the control unit 23 may determine a higher degree of danger as the degree of danger of the area 3 compared with the case where the number of vehicles 10 is equal to or less than the set number.

Example 4

When the information on the vehicle 10 includes the information on the acceleration of the vehicle 10, the control unit 23 may determine the degree of danger of the area 3 by analyzing the information on the acceleration of the vehicle 10. Here, if the vehicle 10 suddenly accelerates, the vehicle 10 may collide with another vehicle in front of the vehicle 10. That is, the acceleration of the vehicle 10 traveling in the area 3 may be related to the risk level of the area 3. Thus, the degree of danger of the area 3 can be determined by analyzing the information on the acceleration of the vehicle 10.

When the acceleration of the vehicle 10 is larger than a reference acceleration set in advance, the control unit 23 may determine a higher degree of danger as the degree of danger of the area 3 compared with the case where the acceleration of the vehicle 10 is equal to or smaller than the reference acceleration. The reference acceleration may be set in advance based on the acceleration of the vehicle 10 that may cause a rear-end collision.

The control unit 23 may detect the number of vehicles 10 that have traveled at accelerations exceeding the reference acceleration during the above-mentioned set period. When the number of detected vehicles 10 exceeds the set number, the control unit 23 may determine a higher degree of danger as the degree of danger of the area 3 compared with the case where the number of vehicles 10 is equal to or less than the set number.

Example 5

When the information on the vehicle 10 includes the information on the steering angle of the wheels of the vehicle 10, the control unit 23 may determine the degree of danger of the area 3 by analyzing the information on the steering angle of the wheels of the vehicle 10. Here, in order to avoid an accident, the driver may suddenly change the traveling direction of the vehicle 10 by suddenly operating the steering wheel. When the traveling direction of the vehicle 10 is suddenly changed, the steering angle of the wheels of the vehicle 10 may suddenly change. Thus, the degree of danger of the area 3 can be determined by analyzing the information on the steering angle of the wheels of the vehicle 10.

When the amount of change in the steering angle of the wheels of the vehicle 10 per unit time is larger than a reference amount set in advance, the control unit 23 may determine a higher degree of danger as the degree of danger of the area 3 compared with the case where the amount of change is equal to or smaller than the reference amount. The reference amount may be set in advance based on the amount of change in the steering angle of the wheels of the vehicle 10 when the vehicle 10 is normally traveling.

The control unit 23 may detect the number of vehicles 10 that have traveled at a steering angle of the wheels having an amount of change larger than the reference amount during the above-mentioned set period. When the number of detected vehicles 10 exceeds the set number, the control unit 23 may determine a higher degree of danger as the degree of danger of the area 3 compared with the case where the number of vehicles 10 is equal to or less than the set number.

Example 6

When the information on the vehicle 10 includes the blinking information of the turn signal of the vehicle 10, the control unit 23 may determine the degree of danger of the area 3 by analyzing the blinking information of the turn signal. Here, the driver can blink the turn signal when turning the vehicle 10 left or right at an intersection. If the turn signal is not blinking when the vehicle 10 turns left or right, the possibility that the vehicle 10 will cause an accident can increase. Thus, the degree of danger of the area 3 can be determined by analyzing the blinking information of the turn signal.

When the vehicle 10 turns left or right at an intersection and the turn signal is not blinking, the control unit 23 may determine a higher degree of danger as the degree of danger of the area 3 compared with the case where the turn signal is blinking. When the information on the vehicle 10 includes the position information of the vehicle 10, the control unit 23 may detect the vehicle 10 turning left or right at the intersection based on the position information of the vehicle 10 and the map information of the area 3 stored in the storage unit 22. Further, when the information of the vehicle 10 includes the data of the captured image of the on-board camera 12, the control unit 23 may detect the vehicle 10 turning left or right at the intersection by analyzing the data of the captured image.

The control unit 23 may detect the number of vehicles 10 whose turn signals are not blinking when turning left or right at an intersection during the above-mentioned set period. When the number of detected vehicles 10 exceeds the set number, the control unit 23 may determine a higher degree of danger as the degree of danger of the area 3 compared with the case where the number of vehicles 10 is equal to or less than the set number.

Example 7

When the information on the vehicle 10 includes the blinking information of the turn signal of the vehicle 10, the control unit 23 may determine the degree of danger of the area 3 in accordance with the result of comparison between a timing of lane change of the vehicle 10 and a timing of blinking of the turn signal. The timing of lane change of the vehicle 10 may be a timing immediately before the vehicle 10 changes lanes or a timing immediately after the vehicle 10 changes lanes. Here, there is a case where the traffic rule such as the Road Traffic Act applied to the area 3 defines the timing at which the turn signal should be blinked when the vehicle 10 changes lanes. In such a case, the control unit 23 may determine whether the timing at which the turn signal blinks matches the timing defined by the traffic rule based on the result of comparing the timing at which the vehicle 10 changes lanes with the timing at which the turn signal of the vehicle 10 blinks. When the control unit 23 determines that the timing at which the turn signal of the vehicle 10 blinks does not match the timing defined by the traffic rule, the control unit 23 may determine a higher degree of danger as the degree of danger of the area 3 compared with the case where the timing at which the turn signal blinks matches the timing defined by the traffic rule.

As an example, when the information on the vehicle 10 includes the position information of the vehicle 10, the control unit 23 may detect the timing of lane change of the vehicle 10 based on the position information of the vehicle 10, the acquisition time associated with the position information of the vehicle 10, and the map information of the area 3 stored in the storage unit 22. As another example, when the information on the vehicle 10 includes the data of the captured image of the on-board camera 12, the control unit 23 may detect the vehicle 10 that changes lanes by analyzing the data of the captured image. The control unit 23 may detect the timing of lane change of the vehicle 10 based on the imaging time associated with the data of the captured image.

The control unit 23 may detect the number of vehicles 10 for which it is determined that the timing at which the turn signal blinks does not match the timing defined by the traffic rule during the above-mentioned set period. When the number of detected vehicles 10 exceeds the set number, the control unit 23 may determine a higher degree of danger as the degree of danger of the area 3 compared with the case where the number of vehicles 10 is equal to or less than the set number.

Example 8

When the information on the vehicle 10 includes the information on the size of the vehicle 10, the control unit 23 may determine the degree of danger of the area 3 by analyzing the information on the size of the vehicle 10. Here, the larger the size of the vehicle 10, the more difficult it is for the vehicle 10 to move swiftly. Therefore, the larger the size of the vehicle 10, the higher the possibility that the vehicle 10 will cause an accident. Further, the larger the size of the vehicle 10, the greater the damage caused by the accident when the vehicle 10 causes an accident. That is, the size of the vehicle 10 traveling in the area 3 may be related to the risk level of the area 3. Thus, the degree of danger of the area 3 can be determined by analyzing the information on the size of the vehicle 10.

When the size of the vehicle 10 is larger than a reference size set in advance, the control unit 23 may determine a higher degree of danger as the degree of danger of the area 3 compared with the case where the size of the vehicle 10 is equal to or smaller than the reference size.

The reference size may be set in advance based on the size of the medium-sized vehicle. Here, there is a case where the size classification of the medium-sized vehicle is defined by laws and regulations or the traffic rule such as the Road Traffic Act applicable to the area 3. In such a case, the reference size may be set in advance based on the size of the medium-sized vehicle defined by the law and regulations or the traffic rule applicable to the area 3. The reference size may include a size corresponding to that included in the size of the vehicle 10. The reference size includes, for example, at least any of the length of the medium-sized vehicle, the width of the medium-sized vehicle, and the height of the medium-sized vehicle, in accordance with any of the length of the vehicle 10, the width of the vehicle 10, and the height of the vehicle 10 included in the size of the vehicle 10.

The control unit 23 may detect the number of vehicles 10 having a size larger than the reference size during the above-mentioned set period. When the number of detected vehicles 10 exceeds the set number, the control unit 23 may determine a higher degree of danger as the degree of danger of the area 3 compared with the case where the number of vehicles 10 is equal to or less than the set number.

Example 9

When the information on the vehicle 10 includes the information on the engine displacement of the vehicle 10, the control unit 23 may estimate the size of the vehicle 10 by analyzing the information on the engine displacement of the vehicle 10. When the estimated size of the vehicle 10 is larger than a reference size set in advance, the control unit 23 may determine a higher degree of danger as the degree of danger of the area 3 compared with the case where the size of the vehicle 10 is equal to or smaller than the reference size.

The control unit 23 may detect the number of vehicles 10 having a size larger than the reference size during the above-mentioned set period. When the number of detected vehicles 10 exceeds the set number, the control unit 23 may determine a higher degree of danger as the degree of danger of the area 3 compared with the case where the number of vehicles 10 is equal to or less than the set number.

Example 10

When the information on the vehicle 10 includes the classification information of the vehicle 10, the control unit 23 may detect the number of commercial vehicles by analyzing the classification information of the vehicle 10. The control unit 23 may determine the degree of danger of the area 3 by detecting the number of commercial vehicles. In general, the size of a commercial vehicle is often larger than the size of a passenger car. If the size of the vehicle 10 is large, as described above, the possibility that the vehicle 10 will cause an accident can increase. Further, the larger the size of the vehicle 10, the greater the damage caused by the accident when the vehicle 10 causes an accident, as described above. Thus, the degree of danger of the area 3 can be determined by analyzing the classification information of the vehicle 10.

When the control unit 23 detects the number of commercial vehicles exceeding the reference number of vehicles set in advance, the control unit 23 may determine a higher degree of danger as the degree of danger of the area 3 compared with the case where the control unit 23 detects number of commercial vehicles equal to or less than the reference number. The reference number may be set in advance based on the traffic volume and the like in the area 3. The control unit 23 may detect the number of trucks as the commercial vehicles. When the control unit 23 detects the number of trucks exceeding the reference number of trucks set in advance, the control unit 23 may determine a higher degree of danger as the degree of danger of the area 3 compared with the case where the detected number of trucks is equal to or less than the reference number.

Example 11

When the information on the vehicle 10 includes the information on the speed of the vehicle 10, the control unit 23 may detect whether the vehicle 10 passed an intersection at which a traffic signal is positioned while the traffic signal was indicating a stop sign, by analyzing the information on the speed of the vehicle 10. When the control unit 23 detects that the vehicle 10 passed the intersection at which the traffic signal is positioned while the traffic signal was indicating a stop sign, the control unit 23 may determine a higher degree of danger as the degree of danger of the area 3 compared with the case where the control unit 23 detects that the vehicle 10 did not pass the intersection.

As an example, when the information on the vehicle 10 includes the position information of the vehicle 10, the control unit 23 may detect the vehicle 10 near the traffic signal based on the position information of the vehicle 10 and the map information of the area 3 stored in the storage unit 22. The control unit 23 may detect whether the vehicle 10 near the traffic signal passed the intersection at which the traffic signal is positioned by analyzing the information on the speed of the vehicle 10. The control unit 23 may detect the time when the traffic signal indicates a stop sign based on the acquisition time associated with the position information of the vehicle 10 and the information on the control timing of the traffic signal stored in the storage unit 22.

As another example, when the information on the vehicle 10 includes the data of the captured image of the on-board camera 12, the control unit 23 may detect the vehicle 10 near the traffic signal by analyzing the data of the captured image. The control unit 23 may detect whether the vehicle 10 near the traffic signal passed the intersection at which the traffic signal is positioned by analyzing the information on the speed of the vehicle 10. The control unit 23 may detect the time when the traffic signal is indicating a stop sign based on the imaging time associated with the data of the captured image and the information on the control timing of the traffic signal stored in the storage unit 22.

The control unit 23 may detect the number of vehicles 10 that have passed the intersection at which the traffic signal is positioned when the traffic signal was indicating a stop sign during the above-mentioned set period. When the number of detected vehicles 10 exceeds the set number, the control unit 23 may determine a higher degree of danger as the degree of danger of the area 3 compared with the case where the number of vehicles 10 is equal to or less than the set number.

Example 12

When the information on the vehicle 10 includes the information on the speed of the vehicle 10, the control unit 23 may detect whether the vehicle 10 stopped at a stop position set in advance by analyzing the information on the speed of the vehicle 10. When the control unit 23 detects that the vehicle 10 did not stop at the stop position, the control unit 23 may determine a higher degree of danger as the degree of danger of the area 3 compared with the case where the control unit 23 detects that the vehicle 10 stopped.

As an example, when the information on the vehicle 10 includes the position information of the vehicle 10, the control unit 23 may detect the vehicle 10 near the stop position based on the position information of the vehicle 10 and the map information of the area 3 stored in the storage unit 22. As another example, when the information on the vehicle 10 includes the data of the captured image of the on-board camera 12, the control unit 23 may detect the vehicle 10 near the stop position by analyzing the data of the captured image. The control unit 23 may detect whether the vehicle 10 near the stop position stopped at the stop position by analyzing the information on the speed of the vehicle 10.

The control unit 23 may detect the number of vehicles 10 that did not stop at the stop position during the above-mentioned set period. When the number of detected vehicles 10 exceeds the set number, the control unit 23 may determine a higher degree of danger as the degree of danger of the area 3 compared with the case where the number of vehicles 10 is equal to or less than the set number.

Example 13

The control unit 23 may detect whether the vehicle 10 is parked in a parking-prohibited place set in advance by analyzing the information on the vehicle 10. When the control unit 23 detects that the vehicle 10 is parked in the parking-prohibited place, the control unit 23 may determine a higher degree of danger as the degree of danger of the area 3 compared with the case where the control unit 23 detects that the vehicle 10 is not parked in the parking-prohibited place.

As an example, when the information on the vehicle 10 includes the position information of the vehicle 10, the control unit 23 may detect the vehicle 10 in the parking-prohibited place based on the position information of the vehicle 10 and the map information of the area 3 stored in the storage unit 22. As another example, when the information on the vehicle 10 includes the data of the captured image of the on-board camera 12, the control unit 23 may detect the vehicle 10 in the parking-prohibited place by analyzing the data of the captured image. The control unit 23 may determine whether the vehicle 10 is in the parking-prohibited place for a reference time set in advance or longer based on the acquisition time associated with the position information of the vehicle 10 or the imaging time associated with the captured image data. When the control unit 23 detects that the vehicle 10 is in the parking-prohibited place for the reference time or longer, it may be considered that the vehicle 10 is parked in the parking-prohibited place. The reference time may be set in advance based on the estimated time for which the driver is away from the vehicle 10. The reference time is, for example, several minutes to several tens of minutes.

The control unit 23 may detect the number of vehicles 10 parked in the parking-prohibited place during the above-mentioned set period. When the number of detected vehicles 10 exceeds the set number, the control unit 23 may determine a higher degree of danger as the degree of danger of the area 3 compared with the case where the number of vehicles 10 is equal to or less than the set number.

Operations of Information Processing System

Figure 3:
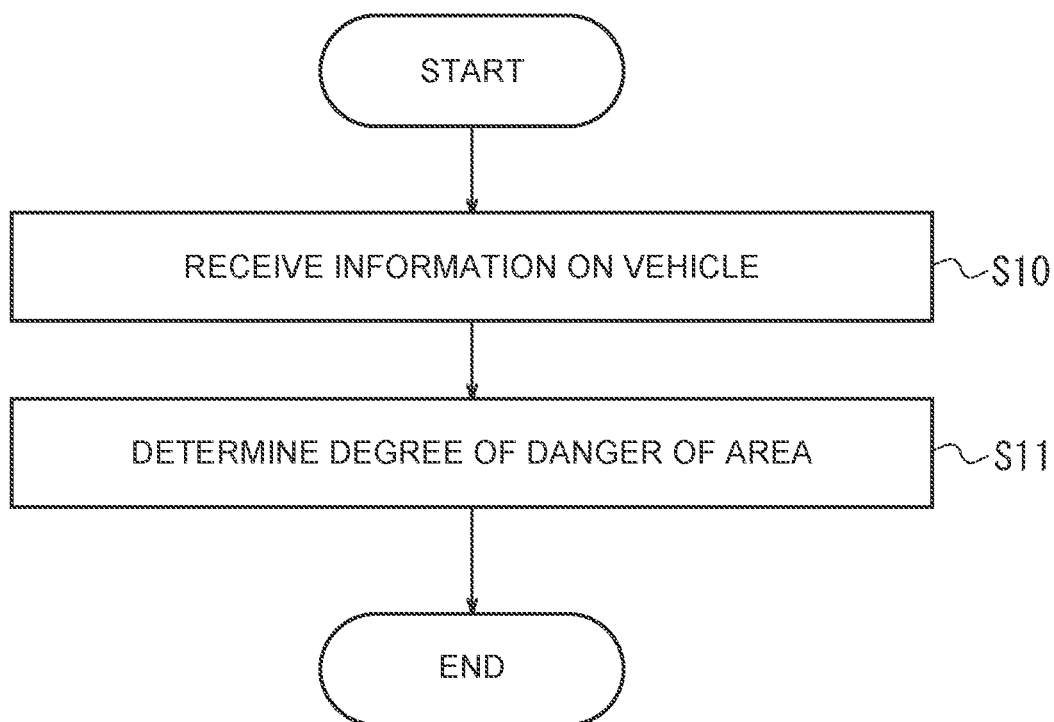
FIG. 3 is a flowchart showing operations of the information processing device shown in FIG. 1.

An example of the operations of the information processing device 20 shown in FIG. 1 will be described with reference to FIG. 3. The operations correspond to an example of the information processing method according to the present embodiment.

The control unit 23 receives the information on at least one vehicle 10 traveling in the area 3 through the communication unit 21 via the network 2 (step S10). The control unit 23 determines the degree of danger of the area 3 based on the received information on the vehicle 10 (step S11).

As described above, in the information processing device 20 according to the present embodiment, the control unit 23 determines the degree of danger of the area 3 based on the information on at least one vehicle 10 traveling in the area 3. The risk of the area 3 can be evaluated based on the risk level of the area 3. With such a configuration, even when the points where accidents frequently occur are not included in the area 3, the area 3 can be evaluated as a dangerous area depending on the degree of danger of the area 3. That is, before accidents occur frequently in the area 3, the area 3 can be specified as a dangerous area depending on the degree of danger of the area 3. Therefore, according to the present embodiment, an improved technique for determining the risk level of the area 3 can be provided.

Further, in the present embodiment, a real estate value of the area 3 can be evaluated according to the degree of danger of the area 3. As an example, the real estate value of the area 3 when the degree of danger of the area 3 is high may be evaluated lower compared with the case where the degree of danger of the area 3 is low.

Further, in the present embodiment, depending on the degree of danger of the area 3, the road environment of the area 3 can be improved in advance in order to reduce accidents. The improvement of the road environment in the area 3 may be an improvement of at least any of curved mirrors, guardrails, pedestrian crossings, school roads, and the like. The improvement of the road environment in the area 3 is, for example, maintenance of curved mirrors, guardrails, pedestrian crossings, school roads, and the like.

The present disclosure is not limited to the embodiments described above. For example, blocks shown in the block diagram may be integrated, or a block may be divided. Instead of executing the steps shown in the flowcharts in chronological order according to the description, the steps may be executed in parallel or in a different order, depending on the processing capacities of the devices that execute the steps, or as necessary. Other changes may be made without departing from the scope of the present disclosure.

For example, in the above embodiment, the information processing device 20 has been described as receiving the information on the vehicle 10 traveling in the area 3 from the vehicle 10 via the network 2. However, the information processing device 20 may receive the information on the vehicle 10 from an element other than the vehicle 10. For example, a speed measuring device for measuring the speed of the vehicle 10 may be installed in the area 3. In such a case, the control unit 23 may receive the information on the speed of the vehicle 10 as the information on the vehicle 10 from the speed measuring device via the network 2 through the communication unit 21.

What is claimed is:

1. An information processing device comprising:
a storage unit that stores map information, wherein the map information includes road map information of an area;
a communication unit connected to a network and configured to communicate the map information to a plurality of vehicles via the network; and
a control unit including a processor that is programmed to:
receive information on at least one vehicle traveling in the area which is received by the communication unit, wherein the information on the at least one vehicle includes information on a steering angle of a wheel of the vehicle, and wherein the at least one vehicle is among the plurality of vehicles;
determine a degree of danger of the area based on the information on the vehicle, wherein
when an amount of change in the steering angle of the wheel per unit time is larger than a reference amount set in advance, determine a higher degree of danger as the degree of danger of the area compared with a case where the amount of change is equal to or smaller than the reference amount;
update the map information in the storage unit to specify the area is a dangerous area according to the degree of danger of the area; and
communicate the updated map information to the plurality of vehicles via the network.

2. The information processing device according to claim 1, wherein:
the information on the vehicle further includes information on a speed of the vehicle; and
when the speed of the vehicle is higher than a reference speed set in advance, the control unit determines a higher degree of danger as the degree of danger of the area compared with a case where the speed of the vehicle is equal to or lower than the reference speed.

3. The information processing device according to claim 2, wherein the speed of the vehicle is a maximum speed of the vehicle that is detected while the vehicle is traveling in the area.

4. The information processing device according to claim 2, wherein the reference speed is set in advance in accordance with a width of a road in the area.

5. The information processing device according to claim 1, wherein:
the information on the vehicle further includes information on a number of times a horn of the vehicle is honked; and
when the number of times the horn of the vehicle is honked is more than a reference number of times set in advance, the control unit determines a higher degree of danger as the degree of danger of the area compared with a case where the number of times the horn is honked is equal to or less than the reference number of times.

6. The information processing device according to claim 1, wherein:
the information on the vehicle further includes information on a deceleration of the vehicle; and
when the deceleration of the vehicle is larger than a reference deceleration set in advance, the control unit determines a higher degree of danger as the degree of danger of the area compared with a case where the deceleration of the vehicle is equal to or smaller than the reference deceleration.

7. The information processing device according to claim 1, wherein:
the information on the vehicle further includes information on an acceleration of the vehicle; and
when the acceleration of the vehicle is larger than a reference acceleration set in advance, the control unit determines a higher degree of danger of the area compared with a case where the acceleration of the vehicle is equal to or smaller than the reference acceleration.

8. The information processing device according to claim 1, wherein:
the information on the vehicle further includes blinking information of a turn signal of the vehicle; and
the control unit determines the degree of danger of the area by analyzing the blinking information of the turn signal.

9. The information processing device according to claim 8, wherein when the control unit detects that the turn signal is not blinking when the vehicle turns left or right at an intersection, the control unit determines a higher degree of danger as the degree of danger of the area compared with a case where the control unit detects that the turn signal is blinking.

10. The information processing device according to claim 8, wherein the control unit determines the degree of danger of the area in accordance with a result of comparing a timing of lane change of the vehicle with a timing of blinking of the turn signal.

11. The information processing device according to claim 1, wherein:
the information on the vehicle further includes information on a size of the vehicle; and
when the size of the vehicle is larger than a reference size set in advance, the control unit determines a higher degree of danger as the degree of danger of the area compared with a case where the size of the vehicle is equal to or smaller than the reference size.

12. The information processing device according to claim 1, wherein:
the information on the vehicle further includes information on an engine displacement of the vehicle; and
the control unit estimates a size of the vehicle by analyzing the information on the engine displacement of the vehicle, and when the size of the vehicle is larger than a reference size set in advance, the control unit determines a higher degree of danger as the degree of danger of the area compared with a case where the size of the vehicle is equal to or smaller than the reference size.

13. The information processing device according to claim 1, wherein:
the information on the vehicle further includes classification information of the vehicle; and
when the control unit detects a number of commercial vehicles exceeding a reference number set in advance by analyzing the classification information of the vehicle, the control unit determines a higher degree of danger as the degree of danger of the area compared with a case where the control unit detects the number of commercial vehicles equal to or less than the reference number.

14. The information processing device according to claim 13, wherein the commercial vehicles are trucks.

15. The information processing device according to claim 1, wherein:
the information on the vehicle further includes information on a speed of the vehicle; and
when the control unit detects that the vehicle passed a an intersection at which a traffic signal is positioned while the traffic signal was indicating a stop sign by analyzing the information on the speed of the vehicle, the control unit determines a higher degree of danger as the degree of danger of the area compared with a case where the control unit detects that the vehicle did not pass the intersection.

16. The information processing device according to claim 1, wherein:
the information on the vehicle further includes information on a speed of the vehicle; and
when the control unit detects that the vehicle did not stop at a stop position set in advance by analyzing the information on the speed of the vehicle, the control unit determines a higher degree of danger as the degree of danger of the area compared with a case where the control unit detects that the vehicle stopped.

17. The information processing device according to claim 1, wherein when the control unit detects that the vehicle is parked in a parking-prohibited place set in advance by analyzing the information on the vehicle, the control unit determines a higher degree of danger as the degree of danger of the area compared with a case where the control unit detects that the vehicle is not parked in the parking-prohibited place.

18. A non-transitory computer-readable storage medium with a program stored therein, the program being configured to cause a computer to perform:
storing map information in a storage unit, wherein the map information includes road map information of an area;
communicating the map information to a plurality of vehicles via a network;
receiving information on at least one vehicle traveling in the area, wherein the information on the vehicle includes information on a steering angle of a wheel of the vehicle, and wherein the at least one vehicle is among the plurality of vehicles; and
determining a degree of danger of the area based on the information on the vehicle, wherein
when an amount of change in the steering angle of the wheel per unit time is larger than a reference amount set in advance, determining a higher degree of danger as the degree of danger of the area compared with a case where the amount of change is equal to or smaller than the reference amount;
updating the map information in the storage unit to specify the area is a dangerous area according to the degree of danger of the area; and
communicating the updated map information to the plurality of vehicles via the network.

19. An information processing method comprising:
storing map information in a storage unit, wherein the map information includes road map information of an area;
communicating the map information to a plurality of vehicles via a network;
receiving, with an information processing device, information on at least one vehicle traveling in the area, wherein the information on the vehicle includes information on a steering angle of a wheel of the vehicle, and wherein the at least one vehicle is among the plurality of vehicles; and
determining, with the information processing device, a degree of danger of the area based on the information on the vehicle, wherein
when an amount of change in the steering angle of the wheel per unit time is larger than a reference amount set in advance, determining a higher degree of danger as the degree of danger of the area compared with a case where the amount of change is equal to or smaller than the reference amount;

updating the map information in the storage unit to specify the area is a dangerous area according to the degree of danger of the area; and communicating the updated map information to the plurality of vehicles via the network.

* * * * *